SYSTEM FOR COMPACTING AND EXPANDING DATA
Filed Oct. 18, 1968
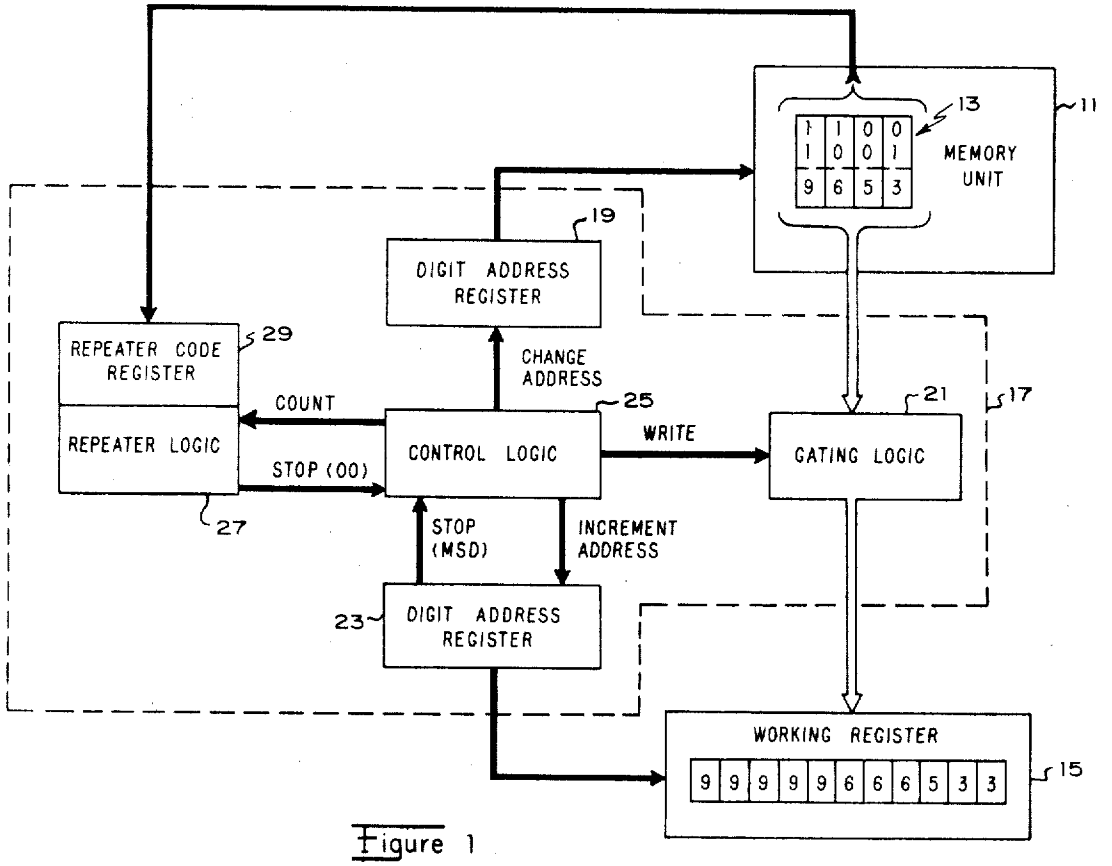
Figure 1
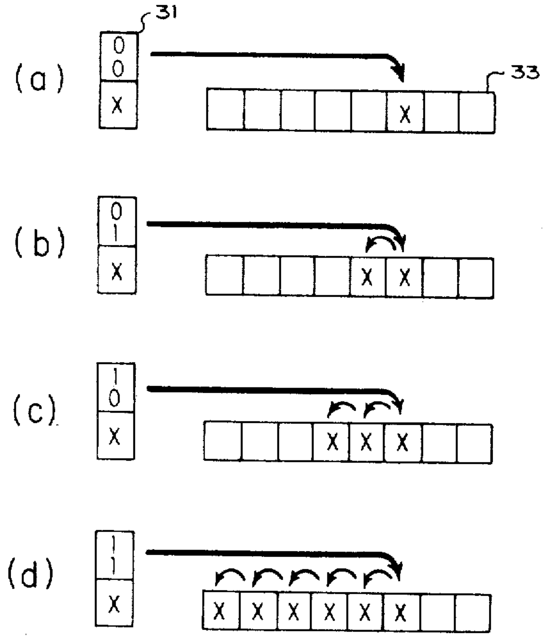
Figure 3
| $t_n$ | $t_{n+1}$ |
|---|---|
| 11 | 11 |
| 10 | 01 |
| 01 | 00 |
| 00 | 00 |
Figure 2
INVENTOR
THOMAS E. OSBORNE
BY Stephen P. Fox
AGENT 3,564,512
Patented Feb. 16, 1971

3,564,512

SYSTEM FOR COMPACTING AND EXPANDING DATA

Thomas E. Osborne, San Francisco, Calif., assignor to Hewlett-Packard Company, Palo Alto, Calif., a corporation of California Filed Oct. 18, 1968, Ser. No. 768,643
Int. Cl. G06f 7/00
U.S. Cl. 340—172.5 2 Claims

ABSTRACT OF THE DISCLOSURE

A data system stores a multidigit number in a memory unit in compacted form. Each digit of a number is stored in the memory along with an associated repeater code. Data expansion logic writes an addressed digit from the memory into a working register in either one digit position or a plurality of successive digit positions, depending on the value of the associated repeater code.

BACKGROUND OF THE INVENTION

The capabilities of a data processing system are often limited by the capacity of the memory unit which stores the data and program instructions. It is desirable to optimize the data storage efficiency of a memory unit in which the maximum storage capacity is fixed by certain hardware considerations such as physical size and cost. This may be achieved by utilizing a storage technique which conserves data character locations within the memory. However, prior art data storage techniques have not focused on the problem of minimizing the storage locations required for large multidigit numbers, such as physical constants, which are often encountered in computations.

SUMMARY OF THE INVENTION

In accordance with the illustrated embodiment of the invention, there is provided a memory unit wherein a data word such as a multidigit number is compacted by placing each digit in a storage location along with an associated repeater code which indicates how many times the digit appears in succession in the number. Thus where several successive digits in a number are the same, the compacted number will contain only one of the repeating digits and a repeater code. When a compacted multidigit number is to be used in a data processing operation, it is written in expanded form into a working register. This is achieved by expansion logic circuitry which sequentially addresses each digit and its associated repeater code in the memory unit and then gates the addressed digit into the number of digit positions in the working register corresponding to the value of the repeater code. The expansion logic includes repeater logic which decrements certain repeater codes in synchronism with the gating of a digit into successive digit positions in the working register. The repetitive writing process continues until the repeater code is decremented to a predetermined stop code, or until the most significant digit of the working register is reached.

BRIEF DESCRIPTION OF THE DRAWINGS

FIG. 1 is a block diagram illustrating the preferred embodiment of the system incorporating the present invention.

FIG. 2 is a truth table illustrating the operation of the repeater logic shown in FIG. 1.

FIGS. 3*a–d* are diagrams illustrating how a character of a compacted word may be expanded under control of an associated repeater code.

DESCRIPTION OF THE PREFERRED EMBODIMENT

Referring now to FIG. 1, there is shown a fixed memory unit 11 containing a plurality of data storage locations represented by the block of four storage locations 13 which form a data word or number. The digits stored in memory unit 11 represent a multidigit number, such as a physical constant, which has been compacted to conserve storage locations. Each storage location includes a first (lower) part for storing a character or digit in BCD notation, and a second (upper) part for storing a binary repeater code associated with the digit. For example the illustrated digit "3" in memory unit 11 has associated therewith the repeater code "01" which is shown above this digit and is read from top to bottom. The repeater code indicates the number of times its corresponding digit is to be read out of the memory unit 11 and is used for purposes which will become apparent from the description hereinafter.

When a number is to be processed or used in a computation, the digits thereof are read out of memory unit 11 and written in expanded form in a working register 15 by an expansion logic circuit 17. More specifically, the expansion logic 17 includes an address register 19 which sequentially selects the digits in the number 13, starting with the least significant digit thereof. For each digit addressed in the memory unit 11, a gating logic circuit 21 is operated to write the digit into particular ones of successive digit positions in the working register 15 which are selected by a digit address register 23. A control logic circuit 25 causes the gating logic 21 and the digit address register 23 to operate in synchronism on successive clock cycles of the system so that the digit address is incremented to the next more significant digit position after a digit has been gated or written into the preceding digit position.

The repetitive gating process continues until the control logic receives a stop signal from the digit address register 23 or from a repeater logic circuit 27. The stop signal from the digit address register 23 is generated when the most significant digit (MSD) of the working register 15 is addressed, and the stop signal from the repeater logic 27 corresponds to a binary code "00" generated thereby, as hereinafter described. After a stop signal is received by the control logic 25, the address in the digit address register 19 is changed to select the more significant digit in memory unit 11 and the process of gating the digit into the working register 15 is repeated.

When a particular digit in memory unit 11 is addressed by the address register 19, the two-bit binary repeater code corresponding thereto is read into a two-bit repeater code register 29. The repeater code stored in this register may be incrementally changed by the aforementioned repeater logic 27 in response to a count signal which is generated by the control logic 25 on each clock cycle and in synchronism with the write signal applied to gating logic 21 and the address incrementing signal applied to the digit address register 23.

The repeater logic 27 changes the repeater code in register 29 in accordance with the format shown in the truth table of FIG. 2. The value to which the repeater code is changed depends on its immediately preceding value. For example, if the repeater code in register 29 is the binary number "10" at time $t_n$, the repeater logic 27 will cause the number in register 29 to become the binary number "01" after one clock cycle, at time $t_{n+1}$. Similarly, the binary repeater code "01" becomes "00" on the next clock cycle. It can be seen that the combination of the repeater logic 27 and the register 29 may operate as a counter to decrement the repeater code to "00." The code "00" acts as a stop code and the control logic 25 is responsive thereto to inhibit the repetitive writing of a digit into successive digit positions in the working register 15, as noted hereinabove. It can also be seen from the truth table of FIG. 2 that if the initial repeater code in register 29 is either "00" or "11," the code is not decremented but instead remains the same on the next clock cycle. In the case where the repeater code in register 29 is the binary number "11," the repetitive digit writing process continues until a stop signal is received from the digit address register 23 when the most significant digit of the working register is reached.

FIGS. 3*a–d* illustrate how different repeater codes associated with a given digit X cause the digit to be written into the working register 15. In FIG. 3*a*, the block 31 corresponds to one of the storage locations in memory unit 11 and each box 33 represents an addressable digit position in the working register 15. The repeater code "00" generates a stop signal after one clock cycle and therefore causes the digit X to be written into one digit position. As shown in FIG. 3*b*, the repeater code "01" is decremented to the stop code "00" in two clock cycles, with the result that the digit X is written into two successive digit poistions. Similarly, as shown in FIG. 3*c*, a repeater code of "10" is decremented to the stop code "00" in three clock cycles, so that X is written into three successive digit positions. Lastly, as illustrated in FIG. 3*d*, a repeater code of "11" remains unchanged in successive clock cycles, so that X is written into successive digit positions until the control logic 25 receives a stop signal from the digit address register 23 indicating that the most significant digit of the working register has been reached.

As noted hereinabove, the digit expansion process is performed for each digit in memory unit 11. Thus in the exemplary number shown in FIG. 1, the compacted four digits "9653" are expanded under control of their respective repeater codes into the eleven digit number shown in the working register 15. It can be seen that in this case the compacting process conserves seven storage locations in the memory unit 11.

What is claimed is:

1. A data expansion system comprising:

memory means containing a plurality of data storage locations, each of said storage locations including:

a first part for storing a data character; and a second part for storing a predetermined repeater code associated with said data character;

working register means having a plurality of character positions for storing a data word to be processed; and expansion logic means for writing a data character from said memory means into said working register means in response to the repeater core corresponding to the data character, said expansion logic means including:

addressing means for selecting data storage locations in said memory means;

addressing means for selecting character positions in said working register means;

means for gating a data character from an addressed storage location in said memory means to an addressed character position in said working register means; and means for controlling said gating means and said addressing means for said working register means to gate a data character from said memory means into successive character positions in said working register means until a character position at an end of said working register means is addressed.

2. The system of claim 1, said addressing means for said working register means including means providing an output signal when the most significant character position of said working register means is addressed; and said controlling means being operable to inhibit said gating means in response to said output signal.

References Cited

UNITED STATES PATENTS

| | | | |
|---|---|---|---|
| 3,299,410 | 1/1967 | Evans | 340—172.5 |
| 3,350,690 | 10/1967 | Rice | 340—172.5 |
| 3,394,352 | 7/1968 | Wernikoff et al. | 340—172.5 |
| 3,400,380 | 9/1968 | Packard et al. | 340—172.5 |
| 3,413,611 | 11/1968 | Pfuetze | 340—172.5 |
| 3,422,403 | 1/1969 | Webb | 340—172.5 |
| 3,438,003 | 4/1969 | Bryon | 340—172.5 |

PAUL J. HENON, Primary Examiner

R. F. CHAPURAN, Assistant Examiner